United States Patent
Bonk et al.

(10) Patent No.: US 10,189,379 B2
(45) Date of Patent: Jan. 29, 2019

(54) SEAT-POSITION SENSING

(71) Applicant: Faurecia Automotive Seating, LLC, Auburn Hills, MI (US)

(72) Inventors: Jeffery T. Bonk, Chesterfield, MI (US); Dale J. Frye, West Olive, MI (US); David A. Moelker, Zeeland, MI (US); Matthew Shinew, Grand Rapids, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 325 days.

(21) Appl. No.: 15/271,815

(22) Filed: Sep. 21, 2016

(65) Prior Publication Data

US 2017/0080826 A1   Mar. 23, 2017

Related U.S. Application Data

(60) Provisional application No. 62/221,655, filed on Sep. 22, 2015.

(51) Int. Cl.
| | |
|---|---|
| *B60N 2/06* | (2006.01) |
| *B60N 2/00* | (2006.01) |
| *B60N 2/02* | (2006.01) |
| *B60N 2/90* | (2018.01) |

(52) U.S. Cl.
CPC ........ *B60N 2/06* (2013.01); *B60N 2002/0272* (2013.01); *B60N 2002/981* (2018.02)

(58) Field of Classification Search
CPC ...... B60N 2/0843; B60N 2/08; B60N 2/0831; B60N 2/123; B60N 2/06

USPC .............. 297/344.1; 248/429; 318/466; 296/65.15; 701/49
See application file for complete search history.

(56) References Cited

U.S. PATENT DOCUMENTS

| | | | |
|---|---|---|---|
| 7,082,359 B2 * | 7/2006 | Breed | G07C 5/008 701/31.5 |
| 7,103,460 B1 * | 9/2006 | Breed | B60C 23/0408 701/29.1 |
| 7,650,210 B2 * | 1/2010 | Breed | B60W 50/0205 701/29.1 |
| 7,788,088 B2 * | 8/2010 | Ablondi | G06F 17/30569 704/9 |
| 8,019,501 B2 * | 9/2011 | Breed | B60J 10/00 701/31.9 |
| 8,024,084 B2 * | 9/2011 | Breed | B60C 23/0493 340/438 |
| 8,060,282 B2 * | 11/2011 | Breed | B60J 10/00 701/36 |

(Continued)

OTHER PUBLICATIONS

Reduction effect of traffic accidents by driver's psychosomatic state monitoring function; Masahiro Miyaji; 2015 IEEE Intelligent Vehicles Symposium (IV); pp. 217-222; year 2015.*

(Continued)

*Primary Examiner* — Cuong H Nguyen
(74) *Attorney, Agent, or Firm* — Barnes & Thornburg LLP

(57) ABSTRACT

A vehicle seat includes a track coupled to a floor of a vehicle, a seat bottom coupled to the track, and a seat back coupled to the seat bottom to extend upwardly away from the seat bottom. The track interconnects the seat back and seat bottom to the floor to cause the seat bottom and seat back to slide back and forth relative to the floor.

22 Claims, 8 Drawing Sheets

(56) References Cited

U.S. PATENT DOCUMENTS

| | | | | |
|---|---|---|---|---|
| 8,157,047 B2* | 4/2012 | Breed | ............... | B60N 2/002 |
| | | | | 180/282 |
| 8,229,624 B2* | 7/2012 | Breed | ............ | B60R 21/0132 |
| | | | | 701/36 |
| 2005/0192727 A1* | 9/2005 | Shostak | ............ | B60C 11/24 |
| | | | | 701/37 |
| 2007/0271014 A1* | 11/2007 | Breed | ............... | B60J 10/00 |
| | | | | 701/31.9 |
| 2008/0040005 A1* | 2/2008 | Breed | ............... | B60J 10/00 |
| | | | | 701/48 |
| 2008/0046149 A1* | 2/2008 | Breed | ............... | B60J 10/00 |
| | | | | 701/45 |
| 2008/0161989 A1* | 7/2008 | Breed | ............... | B60J 10/00 |
| | | | | 701/31.4 |
| 2008/0284575 A1* | 11/2008 | Breed | ............ | B60C 23/0493 |
| | | | | 340/438 |
| 2010/0268423 A1* | 10/2010 | Breed | ............... | B60N 2/002 |
| | | | | 701/45 |
| 2012/0089299 A1* | 4/2012 | Breed | ............... | B60C 11/24 |
| | | | | 701/36 |
| 2014/0239689 A1* | 8/2014 | Schebaum | ......... | B60N 2/0843 |
| | | | | 297/341 |
| 2017/0080826 A1* | 3/2017 | Bonk | ............ | B60N 2/06 |
| 2018/0208082 A1* | 7/2018 | Kuhley | ............... | B60N 2/08 |

OTHER PUBLICATIONS

Smart assistance for public transport system; Reshma Rathod ; S.T. Khot; 2016 International Conference on Inventive Computation Technologies (ICICT); Year: 2016 , vol. 3; pp. 1-5, IEEE Conferences.*

Bicycle management systems in anti-theft, certification, and race by using RFID; Kun-Ying Lin et al.; Proceedings of 2011 Cross Strait Quad-Regional Radio Science and Wireless Technology Conference; Year: 2011 , vol. 2; pp. 1054-1057; IEEE Conferences.*

Active Control of Uncertain Seat Suspension System Based on a State and Disturbance Observer; Mahesh S. Lathkar et al.; IEEE Transactions on Systems, Man, and Cybernetics: Systems; year: 2018 , ( Early Access); pp. 1-11.*

Wheeled inverted-pendulum-type personal mobility robot with collaborative control of seat slider and leg wheels Nobuyasu Tomokuni ; Motoki Shino; 2012 IEEE/RSJ International Conference on Intelligent Robots and Systems ; pp. 5367-5372; year 2012.*

Wheeled inverted-pendulum-type personal mobility robot with collaborative control of seatslider and leg wheelsNobuyasu Tomokuni;Motoki Shino; 2012 IEEE/RSJ International Conference on Intelligent Robots and Systems; Year: 2012; pp. 5367-5372. (Year: 2012).*

* cited by examiner

SEAT-POSITION SENSING

PRIORITY CLAIM

This application claims priority under 35 U.S.C. § 119(e) to U.S. Provisional Application Ser. No. 62/221,655, filed Sep. 22, 2015, which is expressly incorporated by reference herein.

BACKGROUND

The present disclosure relates to a vehicle seat, and particularly to a seat-position sensing system within a vehicle seat. More particularly, the present disclosure relates to a seat-position sensing system used to determine a position of the vehicle seat.

SUMMARY

According to the present disclosure, a vehicle seat includes a track coupled to a floor of a vehicle, a seat bottom coupled to the track, and a seat back coupled to the seat bottom to extend upwardly away from the seat bottom. The track includes a stationary rail coupled to the floor of the vehicle and a movable rail coupled to the seat bottom and configured to move back and forth along a longitudinal axis relative to the floor.

In illustrative embodiments, the vehicle seat further includes a seat-position sensing system that includes a tag reader and one or more location tags. The seat-position sensing system is configured to determine the longitudinal position of the vehicle seat in cooperation with the one or more location tags. Each location tag is a passive transponder coupled to the movable rail of the vehicle seat and is configured to transmit tag location data to the tag reader in response to receiving an electromagnetic signal from the tag reader. The tag reader includes a transmitter and receiver and is coupled to the foundation of the vehicle seat. The one or more location tags are spaced along the length of the movable rail and are configured to provide a unique location identifier to the tag reader.

In illustrative embodiments, each location tag includes an optical receiver, a radio frequency (RF) transmitter, and a microelectromechanical unit (MEMS unit), and is configured to receive an optical signal from the tag reader, transmit tag location data to the tag reader, and provide haptic feedback to an occupant of the vehicle seat. The tag reader includes an optical transmitter and an RF receiver and is configured to receive tag location data from the one or more location tags.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
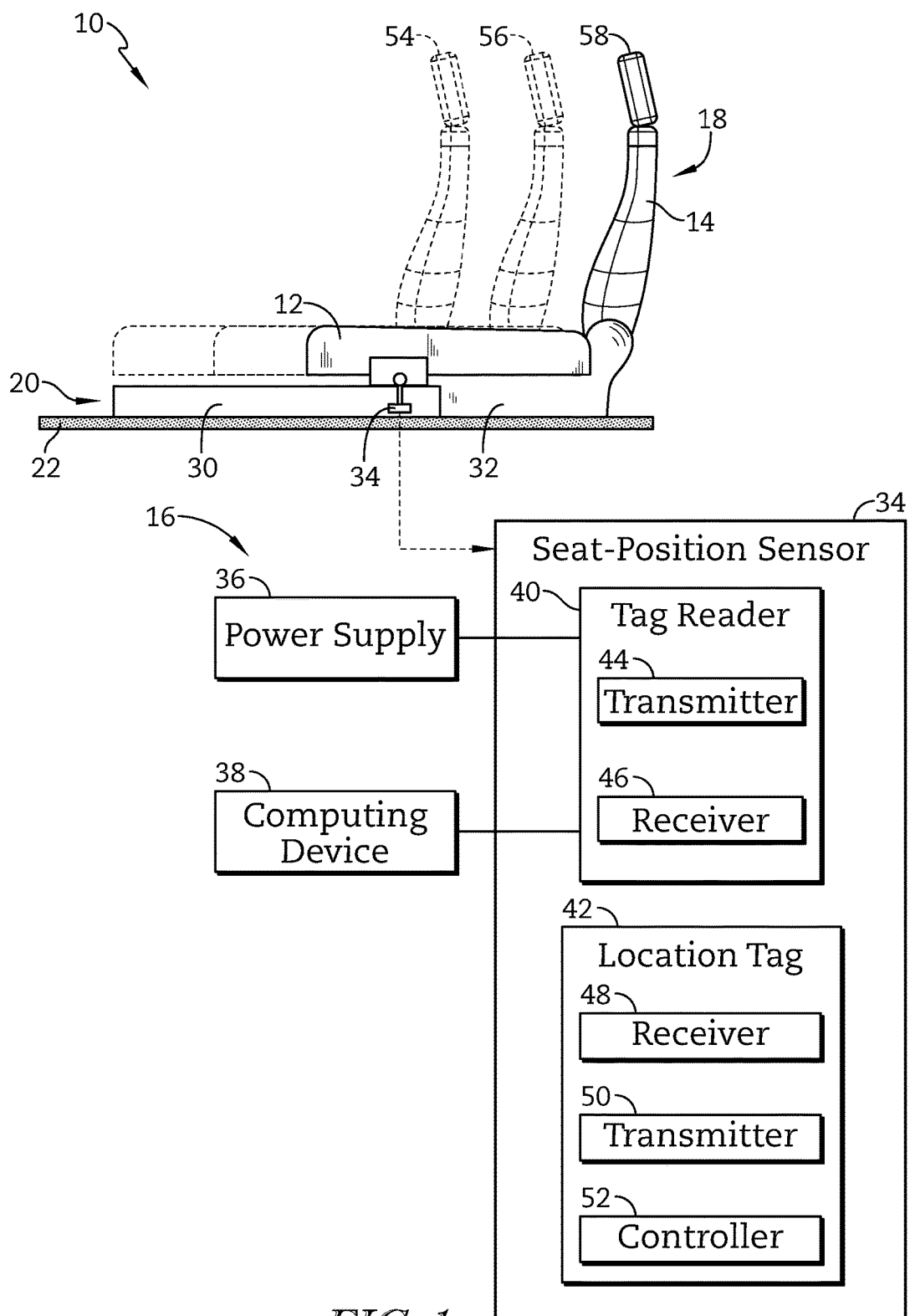
FIG. 1 is a side elevation and diagrammatic view of a vehicle seat in accordance with the present disclosure showing that the vehicle seat includes a seat-position sensing system configured to determine a longitudinal position of the vehicle seat relative to the vehicle frame.
Figure 4:
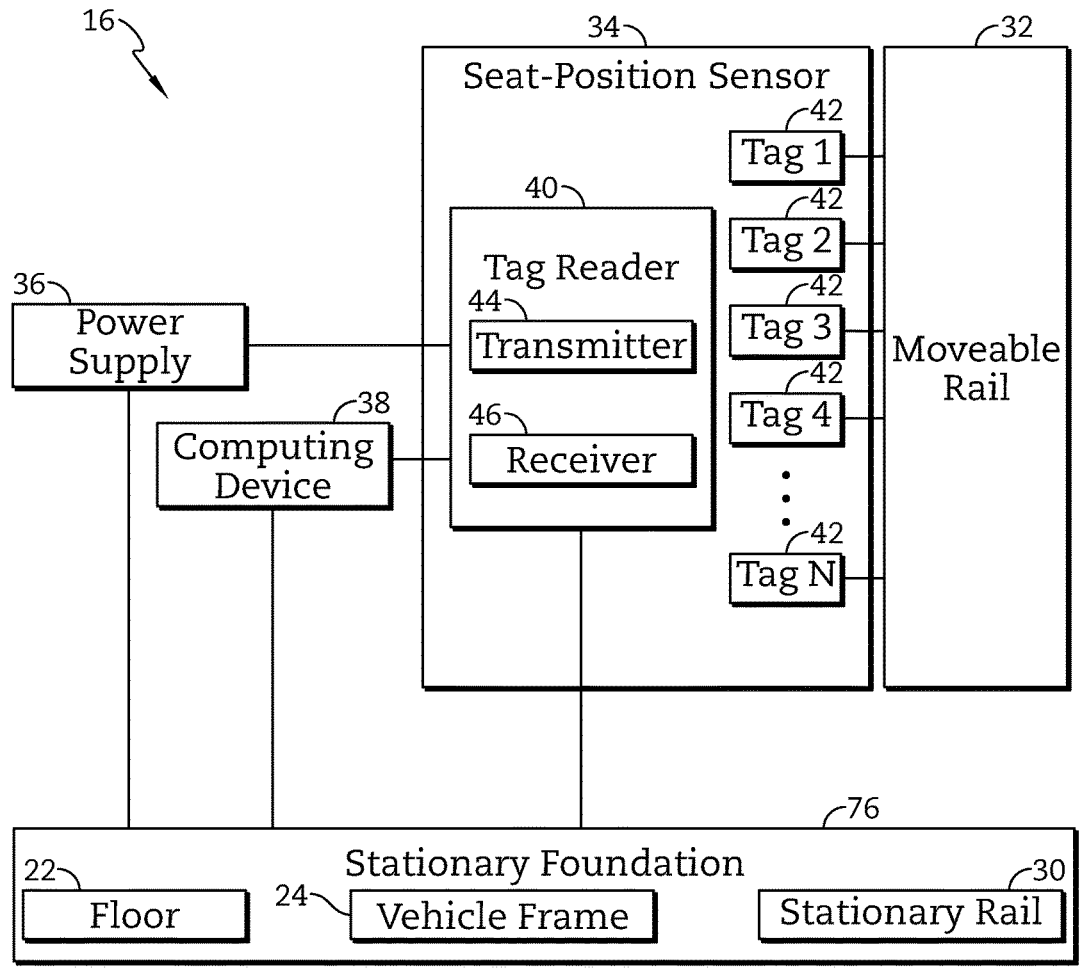
Figure 5:
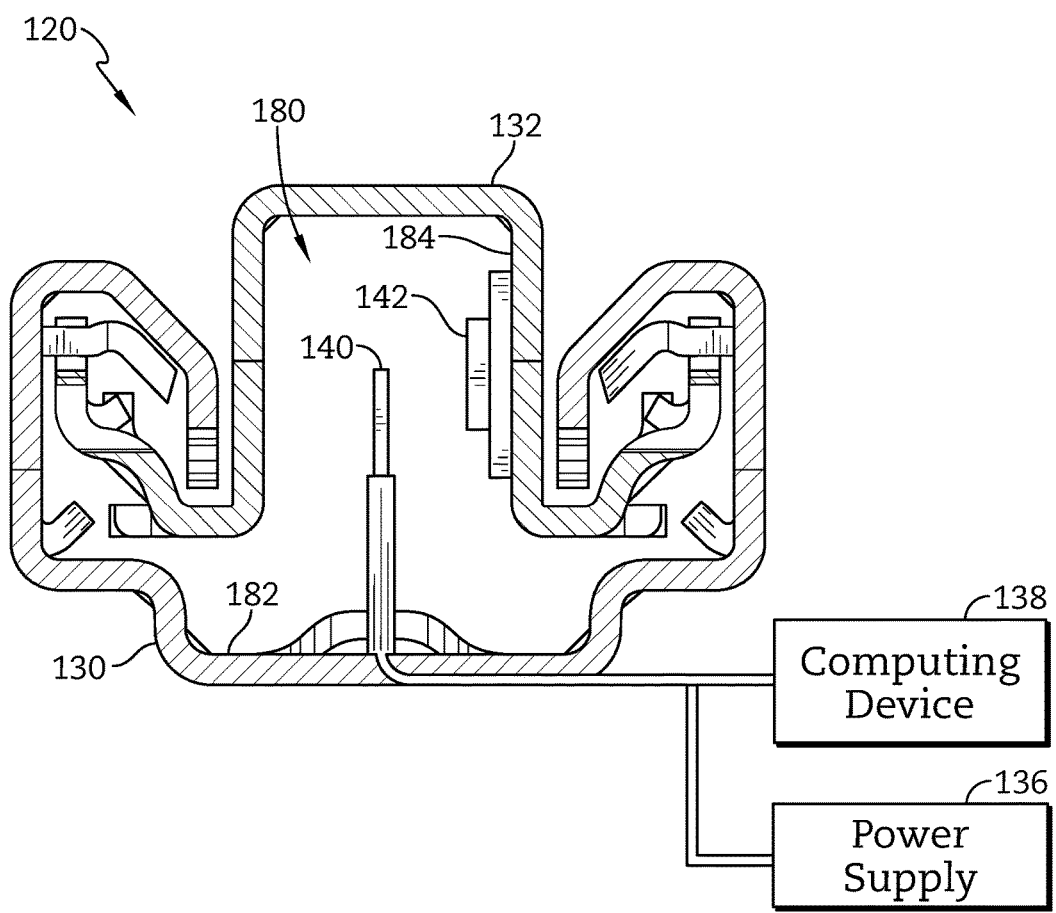
Figure 6:
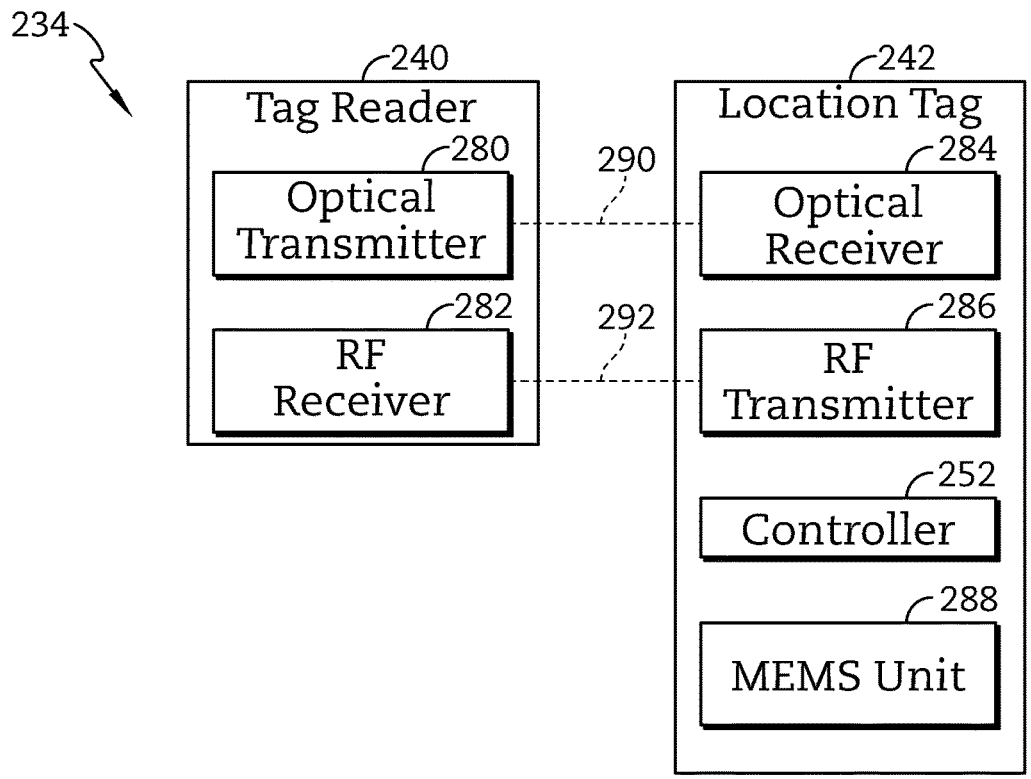
Figure 7:
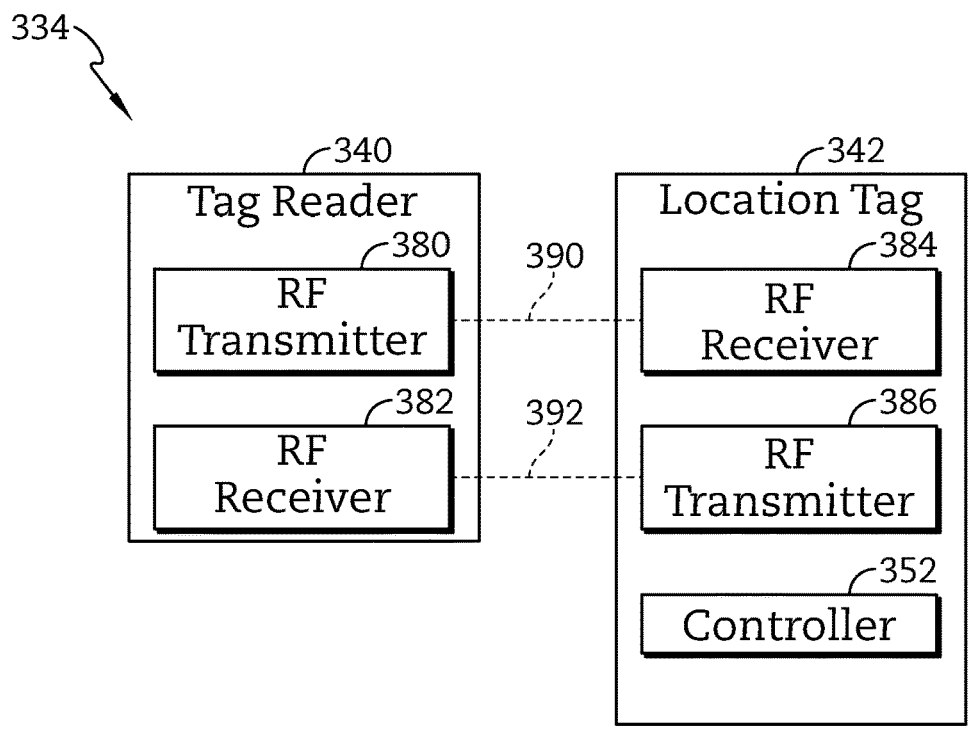
Figure 8:
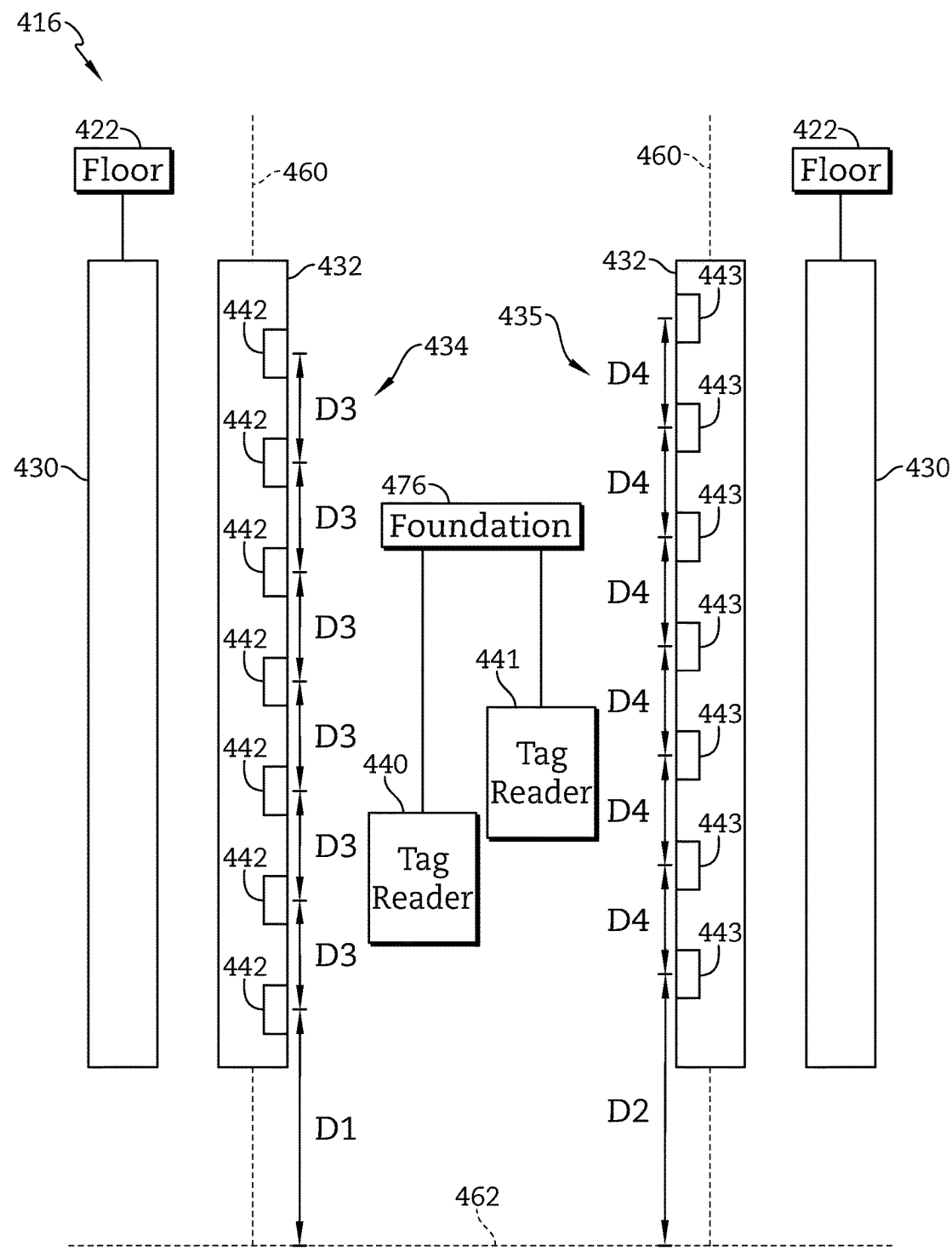
Figure 9:
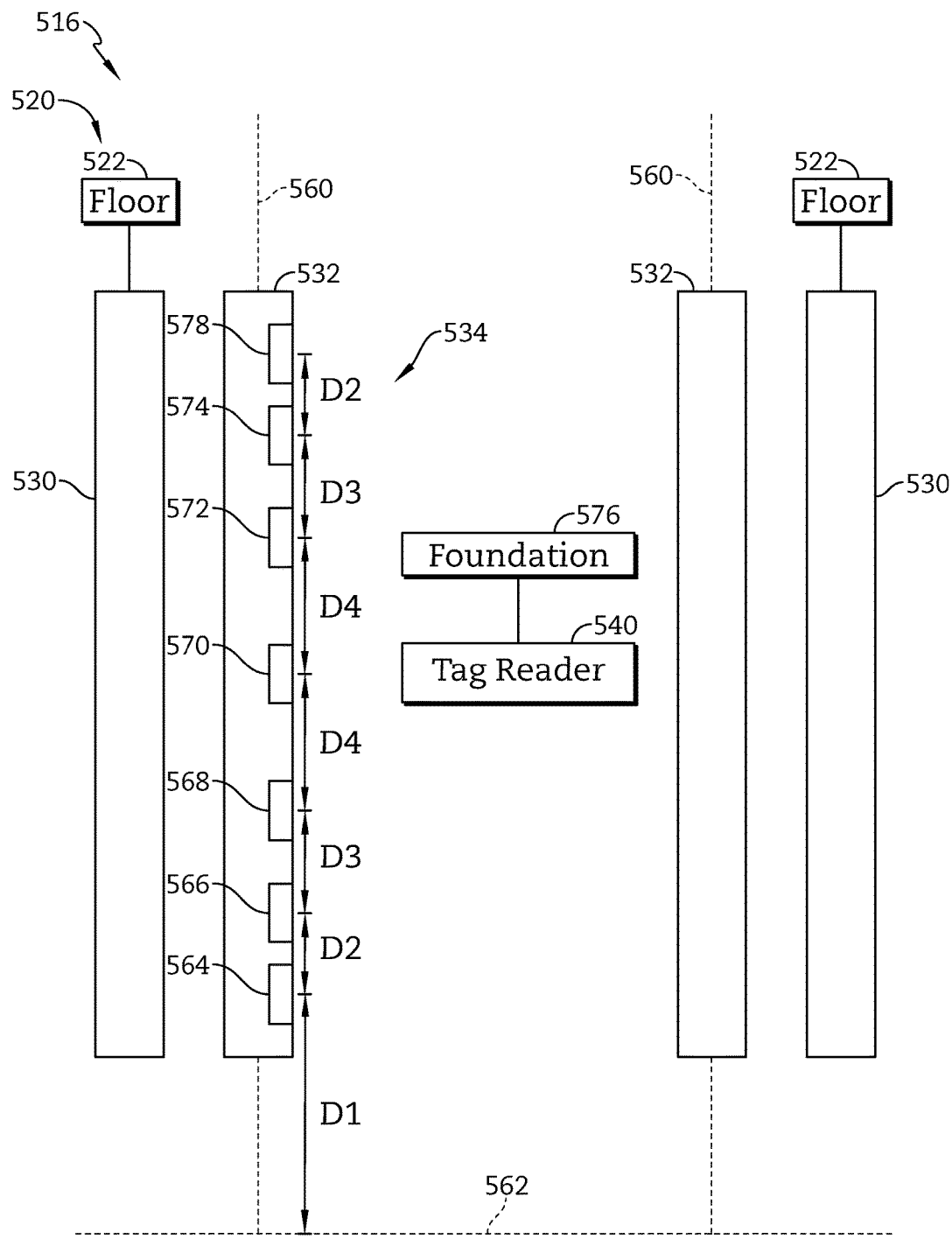

FIG. 4 is a diagrammatic view of the vehicle seat of FIG. 1 showing that the seat-position sensing system includes the tag reader, a power source, and a computing device coupled to a stationary foundation, the position tags coupled to the movable rail, and suggesting that the location tags are configured to cooperate with the tag reader to transmit tag location data to the computing device which determines the longitudinal location of the vehicle seat based on the tag location data;

FIG. 5 is a sectional view of a track included in a vehicle seat showing a movable rail coupled slidably to a stationary rail, a tag reader coupled to the stationary rail, and a location tag coupled to the movable rail and suggesting that the tag reader is coupled to a computing device which determines an absolute longitudinal location of the vehicle seat based on tag-location data received from the location tag;

FIG. 6 is diagrammatic view of a first embodiment of a seat-position sensor in accordance with the present disclosure showing that the seat-position sensor includes a tag reader including an optical transmitter and an RF receiver and location tag including an optical receiver, an RF transmitter, a controller configured to store tag location data, and a MEMS unit configured to provide haptic feedback to an occupant of the vehicle seat;

FIG. 7 is diagrammatic view of a second embodiment of a seat-position sensor in accordance with the present disclosure showing that the seat-position sensor includes a tag reader including an RF transmitter and an RF receiver and a location tag including an RF receiver configured to receive an RF signal from the tag reader, an RF transmitter configured to transmit tag location data, and a controller configured to store tag location data;

FIG. 8 is a diagrammatic view of another embodiment of a seat-position sensing system in accordance with the present disclosure showing that the vehicle seat includes two seat-position sensors coupled to a track included in the vehicle seat and suggesting that the first seat-position sensor is offset from the second seat-position sensor to cause sensor acuity to be maximized; and FIG. 9 is a diagrammatic view of another embodiment of a seat-position sensing system in accordance with the present disclosure showing that location tags included in the seat-position sensing system are spaced apart from one another different distances to provide additional tag location data when the vehicle seat is in particular longitudinal positions.

DETAILED DESCRIPTION

A first embodiment of a vehicle seat 10 includes a passenger support 18, a track 20, and a seat-position sensing system 16, and is configured to determine an absolute longitudinal position of the vehicle seat 10 as shown in FIGS. 1-4. Another embodiment of a seat-position sensing system 116 is shown in FIG. 5. A first embodiment of a seat-position sensor 234 is shown in FIG. 6. A second embodiment of seat-position sensor 334 is shown in FIG. 7. Another embodiment of seat-position sensing system 416 is shown in FIG. 8. Another embodiment of a seat-position sensing system 516 is shown in FIG. 9.

Vehicle seat 10 includes a passenger support 18 adapted to support a passenger in a vehicle thereon and seat-position sensing system 16 as shown in FIG. 1. Seat-position sensing system 16 is configured to provide means for determining an absolute longitudinal position of the passenger support 18 relative to a floor 22 supporting passenger support 18. Seat-position sensing system 16 includes a set of location tags 42 coupled to passenger support 18 to move therewith and a tag reader 40 coupled to the floor in a fixed position relative to the floor. As passenger support 18 moves past tag reader 40, tag reader 40 reads one of location tags 42 and determines the absolute longitudinal position of passenger support 18 associated with each location tag 42.

Vehicle seat 10 in accordance with the present disclosure is shown in FIG. 1. Vehicle seat 10 includes a seat bottom 12, a seat back 14, and seat-position sensing system 16 as shown in FIG. 1. Seat bottom 12 and seat back 14 cooperate to form passenger support 18 for an occupant of the vehicle seat 10. Vehicle seat 10 also includes a track 20. Track 20 interconnects passenger support 18 to floor 22 of a vehicle to cause passenger support 18 to slide selectively back and forth relative to floor 22. Track 20 is coupled to a frame 24 of the vehicle. Track 20 includes two pairs of rails 26, 28 and each pair of rails 26, 28 includes a stationary rail 30 and a movable rail 32. Each movable rail 32 is coupled to seat bottom 12 to move therewith. Each stationary rail 30 is securely coupled to the floor 22 of the vehicle or the frame 24 of the vehicle.

Seat-position sensing system 16 includes a seat-position sensor 34 and a computing device 38 as shown in FIG. 1. Seat-position sensor 34 and computing device 38 are coupled to a power supply 36 of the vehicle. Seat-position sensing system 16 is configured to determine seat position data indicative of the absolute longitudinal position of the passenger support 18.

The absolute longitudinal position of passenger support 18 is the position of passenger support 18 relative to floor 22 and does not require computing of the position through the use of relative positions of various components. Using the tag location data from individual location tags 42, the absolute longitudinal position of passenger support 18 may be determined without calibrating various components to work together.

Figure 2:
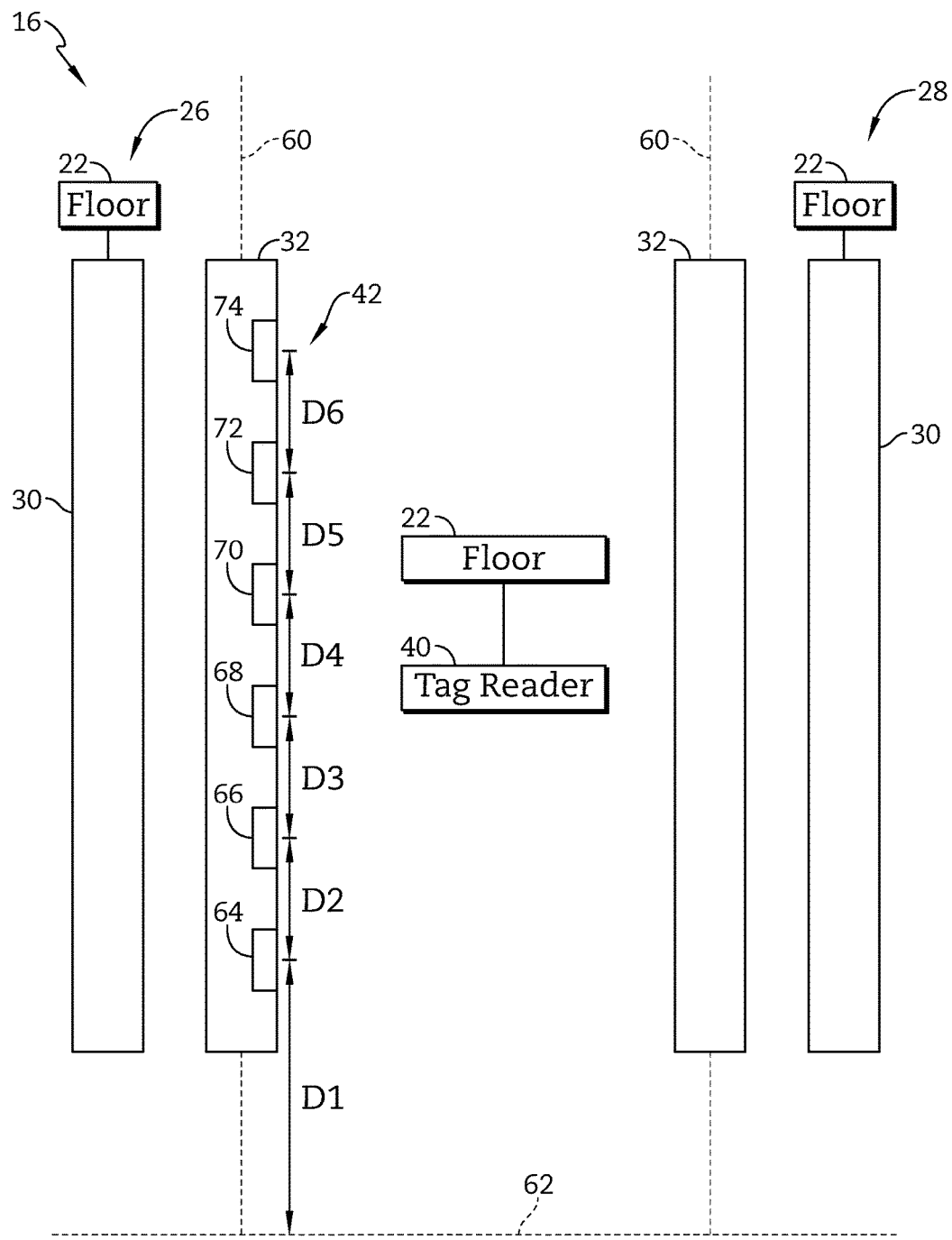
FIG. 2 is diagrammatic view of the foundation of the vehicle seat of FIG. 1 showing that several location tags are positioned on the movable rail, the movable rail slides along the stationary rail coupled to the floor of the vehicle, and the tag reader is coupled to a floor.

Seat-position sensor 34 includes a tag reader 40 and one or more location tags 42 as suggested in FIG. 2. Tag reader 40 includes a transmitter 44 and a receiver 46 as shown in FIG. 4. Transmitter 44 is configured to transmit an electromagnetic signal to at least one of the location tags 42. Receiver 46 is configured to receive tag location data from at least one of the location tags 42. Tag reader 40 receives power from power supply 36 of the vehicle. In one example, power supply 36 is a battery of the vehicle, an alternator of the vehicle, any other suitable power source, or combinations thereof. Tag reader 40 is coupled to a stationary foundation 76 of a vehicle. In one illustrative example, stationary foundation 76 is one of the stationary rails 30 of the track 20, the floor 22 of the vehicle, the frame 24 of the vehicle, or any other suitable alternative.

Tag reader 40 is coupled to the computing device 38 of vehicle and transmits the tag location data to computing device 38. Once computing device 38 receives the tag location data, computing device 38 is configured to determine the absolute longitudinal position of the passenger support 18 relative to the floor 22. The computing device 38 includes sensor data indicative of the position of each location tag 42 on the movable rail 32 and the position of the tag reader 40 on stationary foundation 76. Using both the tag location data and the data about the positions of seat-position sensor 34 elements, computing device 38 determines seat position data indicative of the absolute longitudinal position of passenger support 18. Computing device 38 may be embodied as any device capable of performing the functions described herein. For example, computing device 38 may be embodied as an electronic control unit, embedded controller, control circuit, microcontroller, an integrated circuit, an on-board computer, and/or any other any computing device capable of performing the functions described herein.

Each of the one or more location tags 42 may be embodied as a passive transponder that transmits tag location data in response to being interrogated by the transmitter 44 of the tag reader 40. Each location tag 42 includes a receiver 48, a transmitter 50, and a controller 52. Receiver 48 is configured to receive an electromagnetic signal from transmitter 44. Transmitter 50 is configured to transmit a second electromagnetic signal to the receiver 46 of tag reader 40. The second electromagnetic signal includes tag location data indicative of the position of the location tag on the vehicle seat 10. Controller 52 is configured to store tag location data and generate commands for the transmitter 50. Controller 52 may be embodied as any device capable of performing the functions described herein. For example, controller 52 may be embodied as an electronic control unit, embedded controller, control circuit, microcontroller, integrated circuit, on-board computer, and/or any other any other computing device capable of performing the functions described herein.

Track 20 interconnects passenger support 18 and floor 22 to cause passenger support 18 to move back forth along a longitudinal axis relative to floor 22. Movable rails 32 of track 20 are configured to slide along corresponding stationary rails 30 of track 20 to adjust a longitudinal position of the passenger support 18. In use, passenger support 18 may be positioned in a number of different longitudinal positions 54, 56, 58. Passenger support 18 may be in any one of several positions, for example three, as shown in FIG. 1. Passenger support 18 may occupy any number of longitudinal positions while only three positions are suggested in FIG. 1. At each of the positions 54, 56, 58 seat-position sensing system 16 determines the longitudinal position of passenger support 18 and conveys that information to the occupant of vehicle seat 10.

The one or more location tags 42 are positioned to be spaced apart from one another along movable rail 32 of track 20 as shown diagrammatically in FIG. 2. Track 20 includes a first set of rails 26 and a second set of rails 28. For ease of description, the second set of rails 28 is substantially similar to the first set of rails 26, and thus, only the operation of the first set of rails 26 is described in detail. In some embodiments, the vehicle seat includes more than two sets of rails. In the illustrative embodiment of FIG. 2, the seat-position sensing system 16 is only positioned on the first set of rails 26. In other embodiments, both sets of rails 26, 28 may include a seat-position sensing system 16.

Stationary rail 30 is coupled to floor 22 of the vehicle in a fixed position relative to floor 22. First set of rails 26 defines a longitudinal axis 60 along which movable rail 32 is configured to slide back and forth. Relative to a reference plane 62, movable rail 32 is configured to slide along stationary rail 30 between a first position and a second position. For example, a first position of a movable rail 32 may correspond to full back longitudinal position of the passenger support 18 and the second position of movable rail 32 may correspond to a full forward longitudinal position of the passenger support 18.

Each of the one or more location tags 42 is coupled to movable rail 32 and positioned such that each of the one or more location tags 42 will interact with tag reader 40 as the movable rail 32 moves between the first position and the second position. As shown diagrammatically in FIG. 2, tag reader 40 is coupled to stationary foundation 76 such as floor 22 of the vehicle. Tag reader 40 is positioned such that tag reader 40 interacts with every location tag 42 positioned on movable rail 32.

Each of the one or more location tags 42 is positioned to provide location data about the longitudinal position of the passenger support 18. As shown in FIG. 2, when the movable rail 32 is in the first position, a first location tag 64 is located a distance D1 from the reference plane 62, a second location tag 66 is positioned a distance D2 from the first location tag 64, and an nth location tag (see tags 68, 70, 72, 74) is positioned a distance DN from its neighboring location tag (see distances D3-D6). In some embodiments, reference plane 62 is defined by an end of the track 20 and distance D1 defines the distance between the end of the track 20 and the first location tag 64. In other embodiments, the reference plane 62 may be defined by some other part of the vehicle, such as the floor 22.

In the illustrative embodiment of FIG. 2, six location tags 42 are shown, however, seat-position sensing system 16 may include any number of suitable location tags. In general, the number of location tags 42 positioned on movable rail 32 may be chosen based on the distance movable rail 32 slides between the first position and the second position and the desired resolution of intermediate positions to be measured. For example, if the precise longitudinal position of the passenger support is important, more than six location tags 42 may be positioned on the movable rail to accomplish the desired resolution of longitudinal measurements. In some embodiments, the distances between location tags 42 (e.g., distances D3-D6) are all the same. In other embodiments, the distances between location tags 42 may vary.

Figure 3:
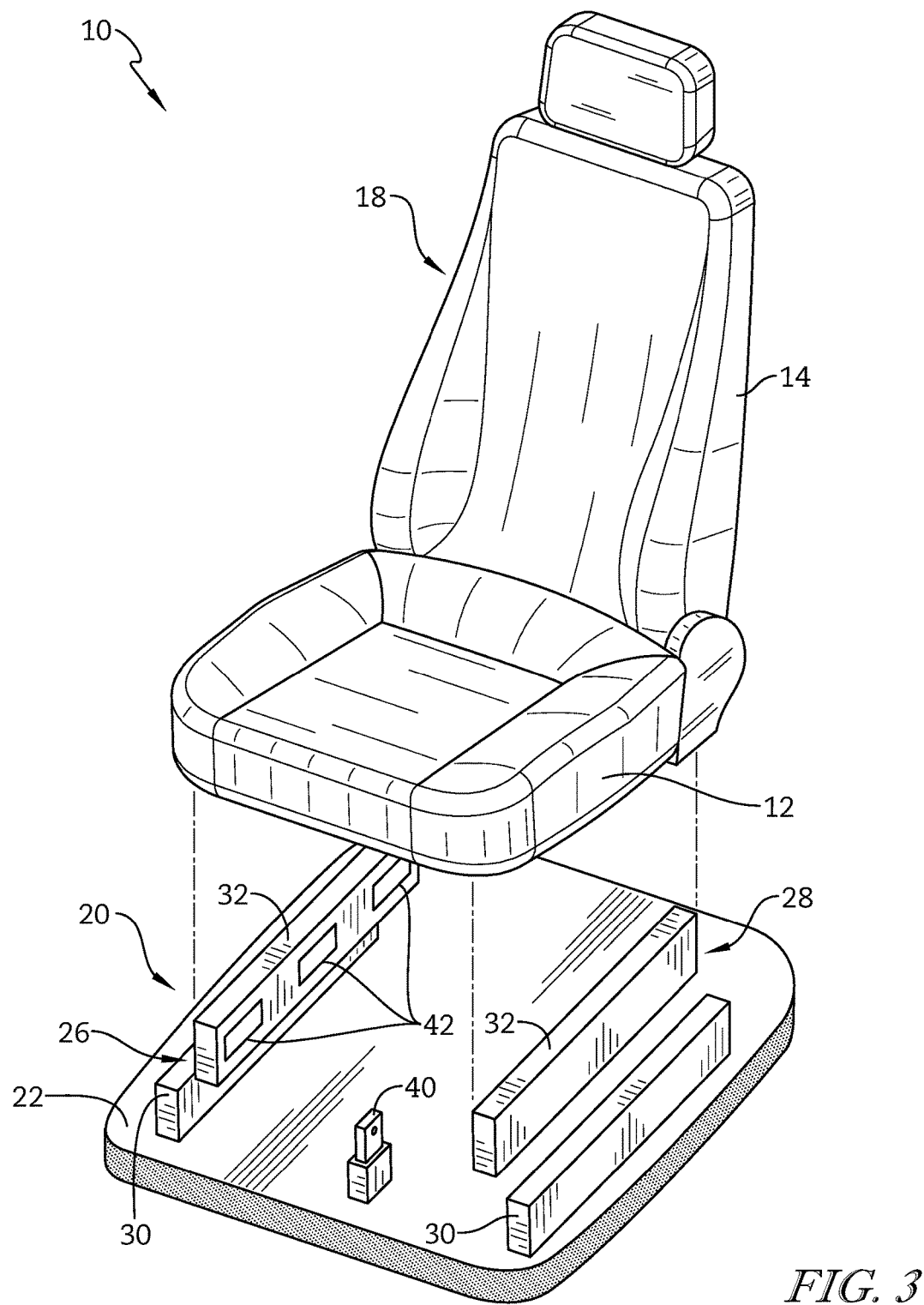
FIG. 3 is an exploded assembly view of the vehicle seat of FIG. 1 showing the stationary rail and the tag reader coupled to the floor of the vehicle, the movable rail coupled slidably to the stationary rail, the vehicle seat coupled to the movable rail, and the one or more location tags coupled to the movable rail.

Tag reader 40 is arranged to cause tag reader 40 to interact with each location tag 42 positioned on movable rail 32. As shown in FIG. 3, tag reader 40 may be positioned on floor 22 of the vehicle underneath passenger support 18. Tag reader 40 is arranged relative to vehicle seat 10 to cause each location tag to be by tag reader 40. While FIG. 3 illustratively shows the tag reader 40 positioned between first set of rails 26 and the second set of rails 28 of the track 20, tag reader 40 may be positioned in other locations based on the movements of track 20, the positions of the location tags 42 on track 20, and the desired resolution of longitudinal positions that are being measured. In other embodiments, the seat-position sensing system includes a one or more location tags positioned on a foundation, such as the floor or stationary rail and a tag reader positioned on the movable rail or the seat bottom.

Power supply 36, computing device 38, and tag reader 40 are coupled to stationary foundation 76 in a fixed position relative to stationary foundation 76 as shown in FIG. 4. Stationary foundation 76 may be embodied as floor 22, frame 24, or stationary rail 30. Illustratively, each of these components may be coupled to a different stationary foundation 76. For example, power supply 36 and computing device 38 may be coupled to frame 24, while tag reader 40 may be coupled to either floor 22 or stationary rail 30. In the illustrative embodiment, tag reader 40 is coupled to power supply 36 and computing device 38 via a wired connection. However, in other embodiments, these components may be connected through a wireless connection such as, for example, WiFi, Bluetooth, or inductive coupling. The one or more location tags 42 (shown as Tag 1, Tag 2, . . . , Tag N in FIG. 4) are coupled to the movable rail 32 to move therewith.

In use, movable rail 32 slides along the stationary rail 30 moving location tags 42 past tag reader 40. Tag reader 40 is configured to interrogate the few location tags 42 that are currently located in close proximity to tag reader 40 by transmitting a first electromagnetic signal via transmitter 44 (e.g., an RF signal or an optical signal). Each location tag 42 that receives the first electromagnetic signal becomes active in response to receiving the first electromagnetic signal (e.g., each location tag is powered by the first electromagnetic signal). Upon receiving the first electromagnetic signal, each location tag 42 transmits unique tag location data indicating what location tags 42 are near the tag reader 40 via a second electromagnetic signal. Tag reader 40 receives the second electromagnetic signal containing the location data via receiver 46 and relays the tag location data to computing device 38. Computing device 38, based on tag location data and data stored on the computing device 38 about the positions of the tag reader 40 and each location tag 42 on the vehicle seat 10, determines seat position data indicative of the absolute longitudinal position of passenger support 18.

Another embodiment of a seat-position sensing system 116 of a vehicle seat 110 in accordance with the present disclosure is shown in FIG. 5. Vehicle seat 110 includes the seat bottom 12 and seat back 14 to form the passenger support 18. A track 120 includes a stationary rail 130 coupled to floor 22 of the vehicle and a movable rail 132 coupled to seat bottom 12. Track 120 is formed to include a cavity 180. Stationary rail 130 and movable rail 132 cooperate to define the cavity 180 in track 120. Tag reader 40 of seat-position sensing system 116 is positioned in the cavity 180. Tag reader 40 is coupled to an interior surface 182 of stationary rail 130 in cavity 180. One or more location tags 42 positioned in cavity 180. One or more location tags 42 are coupled to an interior wall 184 of movable rail 132 inside cavity 180. Each location tag 42 is configured to interact with tag reader 40 and transmit location data to tag reader 40. Tag reader 40 and location tags 42 are protected from being moved or damaged by rails 130, 132 of track 120 as a result of being located in cavity 180. In such a configuration, seat-position sensing system 116 is configured to determine seat position data indicative of the absolute longitudinal position of vehicle seat 110 in a similar manner as described above.

Another embodiment of the seat-position sensor 234 in accordance with the present disclosure is shown in FIG. 6. Seat-position sensor 234 discussed below may be positioned and/or used in any of the ways discussed above. Seat-position sensor 234 includes a tag reader 240 and one or more location tags 242. Tag reader 240 includes an optical transmitter 280 and an RF receiver 282. Optical transmitter 280 is configured to transmit an optical signal 290 (i.e., an electromagnetic signal in the optical frequency range, such as a laser or other light). RF receiver 282 is configured to receive an RF signal 292 (i.e., an electromagnetic signal in the radio frequency range). Each location tag 242 includes an optical receiver 284, an RF transmitter 286, a controller 252, and a microelectromechanical unit 288 (MEMS unit 288). Optical receiver 284 is configured to receive the optical signal 290 transmitted by the optical transmitter 280. RF transmitter 286 is configured to transmit the RF signal 292 received by the RF receiver 282. Controller 252 is configured to store the tag location data unique to the location tag 242. MEMS unit 288 is configured to provide haptic feedback and/or audible feedback to an occupant of the vehicle seat.

In the illustrative embodiment, tag reader 240 and location tags 242 are positioned to create an unobstructed optical link between optical transmitter 280 of tag reader 240 and optical receiver 284 of each location tag 242, depending on the longitudinal position of the vehicle seat. In this way, optical signal 290, transmitted by the optical transmitter 280, has an unobstructed path to optical receiver 284 thereby optimizing an amount of power transmitted to each location tag 242 by tag reader 240. To accomplish this, optical transmitter 280 may be positioned at a particular height above a reference plane and optical receiver 284 of each location tag 242 may be positioned at a similar height above the reference plane. In this embodiment, tag reader 240 is configured to only interact with one location tag 242 at a time via the optical link.

Each location tag 242 uses optical signal 290 transmitted by tag reader 240 to power location tags 242. Once optical signal 290 is received by a location tag 242, controller 252 causes the RF transmitter 286 to transmit, via the RF signal 292, tag location data stored by the controller 252. In some embodiments, controller 252 may also send data to MEMS unit 288.

Optical signal 290 transmitted by tag reader 240 powers MEMS unit 288. MEMS unit 288 may be embodied as a device that includes miniaturized mechanical and electromechanical elements. In general, MEMS units 288 are made using techniques of microfabrication and include physical dimensions from several millimeters to much smaller. In the illustrative embodiment, MEMS unit 288 includes a microprocessor that processes data received from the controller 252 and an actuator configured to produce a mechanical force on the vehicle seat (e.g., causes the vehicle seat to vibrate). Upon being powered, or upon receiving data from the controller 252, the actuator of the MEMS unit produces a mechanical force on the vehicle that is capable of being felt by the occupant of the vehicle seat. The mechanical force acts as a type of haptic feedback indicating to the occupant the longitudinal location of the vehicle seat via a sense of touch. In the illustrative embodiment, MEMS unit 288 of each location tag 242 generates the same mechanical force. In other embodiments, MEMS unit 288 of each location tag 242 is configured to produce a unique mechanical force such that the occupant of the vehicle is capable of determining the exact longitudinal position of the passenger support using only the information conveyed by the mechanical force.

In some embodiments, characteristics of optical signal 290 may be modified to adjust the performance of location tags 242. For example, the frequency of the optical signal 290 transmitted by optical transmitter 280 may be adjusted based on settings adjusted by a user. For example, instead of transmitting a red laser light, optical transmitter 280 may be configured to transmit a green laser light. In this example, controller 252 may be configured to cause the RF transmitter 286 to transmit different tag location data, or adjust properties of RF signal 292 being transmitted based on the frequency of the optical signal 290. Controller 252 may also be configured to cause MEMS unit 288 to output a different mechanical force based on optical signal 290. For example, the pattern of vibrations experienced by the occupant may change depending on the frequency of optical signal 290. In some embodiments, an intensity of optical signal 290 may also be adjusted to affect the performance of location tags 242.

In some embodiments, seat-position sensor 234 may include multiple tag readers 240 positioned at different heights and multiple layers of location tags 242 positioned at corresponding heights to the multiple tag readers 240. In such an embodiment, multiple location tags 242 may be excited simultaneously, thereby increasing the intensity of the haptic feedback experienced by the occupant of the vehicle seat.

Another embodiment of a seat-position sensor 334 in accordance with the present disclosure is shown in FIG. 7. Seat-position sensor 334 discussed below may be positioned or used in any of the ways discussed above. Seat-position sensor 334 includes a tag reader 340 and one or more location tags 342. Tag reader 340 includes an RF transmitter 380 and an RF receiver 382. RF transmitter 380 of the tag reader 340 is configured to transmit a first RF signal 390. RF receiver 382 of tag reader 340 is configured to receive a second RF signal 392. Each location tag 342 includes an RF receiver 384, an RF transmitter 386, and a controller 352. RF receiver 384 of location tag 342 is configured to receive the first RF signal 390 transmitted by RF transmitter 380 of tag reader 340. RF transmitter 386 of location tag 342 is configured to transmit RF signal 392 received by RF receiver 382. Controller 352 is configured to store the tag location data unique to each location tag 342. In some embodiments, seat-position sensor 334 is radio frequency identification (RFID) system with tag reader 340 being embodied as an RFID interrogator and each location tag 342 being embodied as an RFID tag. In another example, seat-position sensor 334 is a near-field communication system (NFC).

In the illustrative embodiment, each location tag 342 is configured to be powered by the first RF signal 390 transmitted by tag reader 340. Once first RF signal 390 is received by a location tag 342, controller 352 causes tag RF transmitter 386 to transmit, via the second RF signal 392, the tag location data stored by controller 352. The strength of the first RF signal 390 is set such that only a few location tags 342 are powered at any given time. In the illustrative embodiment, the strength of the first RF signal 390 is set such that only one location tag 342 is powered at a time.

Another embodiment of a seat-position sensing system 416 in accordance with the present disclosure is shown in FIG. 8. Seat-position sensing system 416 includes a first set of rails 426 that include a first seat-position sensor 434 and a second set of rails 428 that include a second seat-position sensor 435 offset from the first seat-position sensor 434. First seat-position sensor includes a tag reader 440 coupled to a foundation 476 and one or more location tags 442 coupled to a movable rail 432 of first set of rails 426. When movable rail 432 of first set of rails 426 is in a first position, a first tag of location tags 442 is positioned at a distance D1 from a reference plane 462. In the illustrative embodiment, each tag of the location tags 442 is located in spaced-apart relation from each neighboring tag by a distance D3. Distance D3 corresponds to the resolution of seat position data to be conveyed to an occupant of the vehicle seat. For example, if the distance D3 equals 10 mm, then an occupant will know the precise longitudinal location of the passenger support in 10 mm increments.

Similarly, second seat-position sensor 435 includes a tag reader 441 coupled to the foundation 476 and one or more location tags 443 coupled and positioned on a movable rail 432 of second set of rails 426. Second seat-position sensor 435, tag reader 441, and location tags 443 are similarly embodied as seat-position sensor 34, tag reader 40, and location tags 42 described above. When movable rail 432 of first set of rails 428 is in a first position, a first tag of the location tags 443 is positioned at a distance D2 from reference plane 462. In the illustrative embodiment, each tag of location tags 443 is located in spaced-apart relation to each neighboring tag by a distance D4.

In the illustrative embodiment, distance D2 is different than the distance D1, but distance D3 is equivalent to distance D4. In this way, the position of second seat-position sensor 435 is offset from the position of first seat-position sensor 434. This offset of position allows the entire seat-position sensing system 416 to determine the absolute longitudinal position of the passenger support with greater precision without positioning more location tags on a given movable rail 432. In some applications, if the location tags are too close together they may interfere with one another, either by physically overlapping, or by both sending tag location data to the tag reader simultaneously.

By positioning second seat-position sensor 435 on second set of rails 428, the absolute longitudinal position of the passenger support may be measured with greater precision. For example, if distance D3 between location tags 442 of first seat-position sensor 434 is 10 mm, an occupant will know the precise absolute longitudinal position of the passenger support in increments of 10 mm. In this same example, distances D2 and D4 may be set such that location tags 443 of the second seat-position sensor 435 cooperate with location tags 442 of the first seat-position sensor 434 to provide precise longitudinal locations of the passenger support every 5 mm.

In another embodiment, a seat-position sensing system 516 includes a number of location tags 542 positioned on a movable rail 532 of a track 520 such that the spacing between each location tag 542 is varied. In this way, seat-position sensing system 516 may be able to more precisely measure the longitudinal position of the vehicle seat along certain areas of the vehicle seat's progression between the first position and the second position. For example, an occupant may want to know the precise location of a passenger support with more precision as the vehicle seat approaches the full-forward position or the full-backward position of the passenger support. To increase the precision of measurement, certain location tags 542 located near the ends of movable rail 532 are positioned to be closer together, while location tags 542 located in the middle of movable rail 532 are positioned to be farther apart. While the illustrative embodiment shows location tags 542 being packed more closely together at either end of track 520, in other embodiments, other configurations of varied spacing are possible.

A first location tag 564 is located at one of the track 520 as shown in FIG. 9. When movable rail 532 is in the first position, first location tag 564 is a positioned to be a distance D1 from a reference plane 562. A second location tag 566 is positioned adjacent to first location tag 564 a distance D2 from the first location tag 564. A third location tag 568 is positioned adjacent to second location tag 566 a distance D3 from second location tag 566. A fourth location tag 570 is positioned adjacent to third location tag 568 a distance D4 from third location tag 568. Location tags 542 further positioned on the movable rail 532 then repeat the same spacing, but in reverse order. In the illustrative embodiment, each of the distances D2-D4 are all different to cause certain sections of the track 520 to have location tags 542 more densely packed together and other sections of the track 520 to have location tags 542 more spaced apart. In other embodiments, the location tags in the middle of the movable rail are more closely spaced together than the location tags at either end of the movable rail. In yet other embodiments, the spacing between location tags may be varied to create any type of distribution of location tags.

An occupant support comprises a stationary component, a movable component coupled to the stationary component to move relative to the stationary component, and a position sensing system. The position sensing system is configured to determine an absolute position of the movable component relative to the stationary component. The position sensing system includes a reader configured to transmit a first signal and receive a second signal associated with the position of the movable component and a location tag configured to transmit the second signal in response to receiving the first signal.

A seat-position sensing system in accordance with the present disclosure may be used to determine an absolute or actual location of a moving component relative to a stationary component in an occupant support. In one example, the seat-position sensing system determines a longitudinal position of a movable rail included in a track relative to a stationary rail included in the track. In another example, the seat-position sensing system determines a rotational angle of a moving seat back relative to seat bottom. In another example, the seat-position sensing system determines a height of a moving seat bottom relative a floor of the vehicle. In another example, the seat-position sensing system determines a tilt of a moving seat bottom relative to a floor of the vehicle. In another example, the seat-position sensing system determines a position of an adjustable portion of an adjustable cushion relative to a stationary portion of an adjustable cushion. In another example, the seat-position sensing system determines a location of a moving headrest relative to a backrest included in a seat back. In another example, the seat-position sensing system determines an angle of a moving upper back adjuster relative to a stationary portion of the backrest included in the seat back.

The invention claimed is:

1. A vehicle seat comprising
    a seat bottom,
    a seat back coupled to the seat bottom to move relative to the seat bottom, and
    a track including a stationary rail adapted to be coupled to a floor included in a vehicle in a fixed position relative to the floor and a movable rail coupled to the seat bottom in a fixed position relative to the seat bottom and coupled to the stationary rail to cause the seat bottom and seat back to move back and forth relative to the stationary rail, and
    a seat-position sensing system configured to determine a longitudinal position of the seat bottom relative to the stationary rail, the seat-position sensing system including a tag reader configured to transmit a first signal and receive a second signal associated with the longitudinal position of the seat bottom and a location tag configured to transmit the second signal in response to receiving the first signal.

2. The vehicle seat of claim 1, wherein the tag reader is coupled to the stationary rail in a fixed position relative to the stationary rail.

3. The vehicle seat of claim 2, wherein the location tag is coupled to the movable rail to move therewith.

4. The vehicle seat of claim 3, wherein the location tag is a passive transponder.

5. The vehicle seat of claim 4, wherein the tag reader includes a transmitter configured to emit the first signal and a receiver configured to receive the second signal.

6. The vehicle seat of claim 3, wherein the tag reader includes an optical transmitter configured to send the first signal and an RF receiver configured to receive the second signal from the location tag.

7. The vehicle seat of claim 6, wherein the location tag includes an optical receiver configured to receive the first signal from the tag reader, a radio frequency (RF) transmitter configured to transmit the second signal, and a microelectromechanical unit configured to provide haptic feedback to an occupant of the vehicle seat in response to receiving the first signal.

8. The vehicle seat of claim 1, wherein the tag reader is coupled to the movable rail to move therewith and the location tag is coupled to the stationary rail in a fixed position relative to the stationary rail.

9. The vehicle seat of claim 8, wherein the location tag is a passive transponder.

10. The vehicle seat of claim 9, wherein the tag reader includes a transmitter configured to emit the first signal and a receiver configured to receive the second signal.

11. The vehicle seat of claim 8, wherein the tag reader includes an optical transmitter configured to send the first signal and an RF receiver configured to receive the second signal from the location tag.

12. The vehicle seat of claim 11, wherein the location tag includes an optical receiver configured to receive the first signal from the tag reader, a radio frequency (RF) transmitter configured to transmit the second signal, and a microelectromechanical unit configured to provide haptic feedback to an occupant of the vehicle seat in response to receiving the first signal.

13. The vehicle seat of claim 1, wherein the location tag is a passive transponder.

14. The vehicle seat of claim 13, wherein the tag reader includes a transmitter configured to emit the first signal and a receiver configured to receive the second signal.

15. The vehicle seat of claim 1, wherein the tag reader includes an optical transmitter configured to send the first signal and an RF receiver configured to receive the second signal from the location tag.

16. The vehicle seat of claim 15, wherein the location tag includes an optical receiver configured to receive the first signal from the tag reader, a radio frequency (RF) transmitter configured to transmit the second signal, and a microelectromechanical unit configured to provide haptic or audible feedback to an occupant of the vehicle seat in response to receiving the first signal.

17. The vehicle seat of claim 1, wherein the seat-position sensing system further includes a series of location tabs including the location tag, each location tab included in the series of location tabs is spaced apart equally from neighboring location tags included in the series of location tabs.

18. The vehicle seat of claim 1, wherein the seat-position sensing system further includes a series of location tabs including the location tag, the location tag is located between a first end of the stationary track and an opposite second end of the station track closer to the first end than the second end, a second location tag included in the series of location tabs is located between the location tag and the second end, and a third location tag is located between the second location tag and the second end.

19. The vehicle seat of claim 18, wherein the second location tag is located a first distance from the location tag, the third location tag is located a second distance from the first location tag, and the second distance is greater than the first distance.

20. A vehicle seat sensor system for detecting a position of the vehicle seat, the vehicle seat sensor system comprising a vehicle seat including a seat bottom, a seat back coupled to the seat bottom to move relative to the seat bottom, and a track including a stationary rail adapted to be coupled to a floor included in a vehicle in a fixed position relative to the floor and a movable rail coupled to the seat bottom in a fixed position relative to the seat bottom and coupled to the stationary rail to cause the seat bottom and seat back to move back and forth relative to the stationary rail and an electronic system configured to detect an absolute position of the movable rail relative to the stationary rail, wherein the electronic system includes a reader coupled to the stationary rail in a fixed position relative to the stationary rail and a passive transponder coupled to the seat bottom to move therewith and configured to provide haptic feedback in response to powering of the passive transponder by the reader.

21. A vehicle seat sensor system for detecting a position of the vehicle seat, the vehicle seat sensor system comprising a vehicle seat including a seat bottom, a seat back coupled to the seat bottom to move relative to the seat bottom, and a track including a stationary rail adapted to be coupled to a floor included in a vehicle in a fixed position relative to the floor and a movable rail coupled to the seat bottom in a fixed position relative to the seat bottom and coupled to the stationary rail to cause the seat bottom and seat back to move back and forth relative to the stationary rail, a tag reader coupled to the stationary rail in a fixed position relative to the stationary rail and configured to receive tag location data indicative of a position of the vehicle seat, the tag reader including a transmitter configured to transmit a first electromagnetic signal and a receiver configured to receive a second electromagnetic signal, and a location tag coupled to the movable rail to move therewith and configured to transmit tag location data to the tag reader, the location tag including a receiver configured to receive the first electromagnetic signal from the transmitter of the tag reader and to cause the location tag to be powered, and a transmitter configured to transmit the position data to the receiver of the tag reader via the second electromagnetic signal.

22. A vehicle seat sensor system for detecting a position of the vehicle seat, the vehicle seat sensor system comprising a vehicle seat including a seat bottom, a seat back coupled to the seat bottom to move relative to the seat bottom, and a track including a stationary rail adapted to couple to a floor included in a vehicle in a fixed position relative to the floor and a movable rail coupled to the seat bottom in a fixed position relative to the seat bottom and coupled to the stationary rail to cause the seat bottom and seat back to move back and forth relative to the stationary rail, a tag reader coupled to the stationary rail in a fixed position relative to the stationary rail and configured to receive tag location data indicative of a position of the vehicle seat, the tag reader including an optical transmitter configured to transmit an optical signal and an RF receiver configured to receive a RF signal, and a location tag coupled to the movable rail to move therewith and configured to transmit tag location data to the tag reader, the location tag including an optical receiver configured to receive the optical signal and power the tag based on the optical signal, an RF transmitter configured to transmit the tag location data to the tag reader via the RF signal in response to receiving the optical signal and, a microelectromechanical device configured to provide haptic feedback to an occupant of the vehicle seat in response to receiving the optical signal.

\* \* \* \* \*